(12) United States Patent
Le et al.

(10) Patent No.: US 12,413,516 B2
(45) Date of Patent: Sep. 9, 2025

(54) NETWORK INTERFACE DEVICE-BASED COMPUTATIONS

(71) Applicant: Intel Corporation, Santa Clara, CA (US)

(72) Inventors: Yanfang Le, Madison, WI (US); Daniel A. Alvarez, Oakland, CA (US); Amedeo Sapio, San Jose, CA (US); John Andrew Fingerhut, Cary, NC (US)

(73) Assignee: Intel Corporation, Santa Clara, CA (US)

( * ) Notice: Subject to any disclaimer, the term of this patent is extended or adjusted under 35 U.S.C. 154(b) by 803 days.

(21) Appl. No.: 17/515,222

(22) Filed: Oct. 29, 2021

(65) Prior Publication Data
US 2022/0060418 A1   Feb. 24, 2022

(51) Int. Cl.
*H04L 45/74* (2022.01)
*H04L 45/00* (2022.01)

(52) U.S. Cl.
CPC .............. *H04L 45/74* (2013.01); *H04L 45/38* (2013.01)

(58) Field of Classification Search
CPC ................................ H04L 45/74; H04L 45/38
See application file for complete search history.

(56) References Cited

U.S. PATENT DOCUMENTS

| | | | |
|---|---|---|---|
| 10,050,854 B1 | 8/2018 | Licking et al. | |
| 10,412,002 B1 * | 9/2019 | Richardson | H04L 45/74 |
| 10,771,401 B2 | 9/2020 | Javadi et al. | |
| 10,986,042 B2 | 4/2021 | Javadi et al. | |
| 11,057,318 B1 | 7/2021 | Matthews et al. | |
| 2004/0218623 A1 * | 11/2004 | Goldenberg | H04L 12/4633 370/466 |

(Continued)

FOREIGN PATENT DOCUMENTS

WO   2018125462 A1   7/2018

OTHER PUBLICATIONS

Cheng, Peng, et al., "Catch the Whole Lot in an Action: Rapid Precise Packet Loss Notification in Data Center", USENIX, This paper is included in the Proceedings of the 11th USENIX Symposium on Networked Systems Design and Implementation (NSDI '14). Apr. 2-4, 2014 • Seattle, WA, USA, https://www.usenix.org/system/files/conference/nsdi14/nsdi14-paper-cheng.pdf, 13 pages.

(Continued)

*Primary Examiner* — Michael Thier
*Assistant Examiner* — Tracy Lauren Colbert
(74) *Attorney, Agent, or Firm* — Essential Patents Group, LLP; Christopher K. Gagne

(57) ABSTRACT

Examples described herein relate to a switch comprising: circuitry, when operational, to receive a packet comprising a header and a payload and in conjunction with performance of computation on the packet payload, forward the packet header, but not the payload, to a destination endpoint. In some examples, the destination endpoint of the packet is to perform management of reliable transport. In some examples, the circuitry includes programmable data plane circuitry comprising ingress pipeline or egress pipeline and one or more match action units (MAUs) to perform processing of the payload, wherein the programmable data plane circuitry is to perform computation on the packet payload.

17 Claims, 12 Drawing Sheets

(56) References Cited

U.S. PATENT DOCUMENTS

| | | | |
|---|---|---|---|
| 2011/0188372 A1 | 8/2011 | Yalagandula et al. | |
| 2016/0259578 A1* | 9/2016 | Hirai | G06F 3/0665 |
| 2020/0007473 A1* | 1/2020 | Kim | H04L 41/08 |
| 2021/0037107 A1* | 2/2021 | Klenk | H04L 12/1886 |
| 2021/0194831 A1 | 6/2021 | Huang et al. | |
| 2021/0306206 A1* | 9/2021 | Bugenhagen | H04L 12/1868 |
| 2023/0208757 A1* | 6/2023 | Wang | H04L 45/74 |

OTHER PUBLICATIONS

Gebara, Nadeen, et al., "In-Network Aggregation for Shared Machine Learning Clusters", Proceedings of the 4th MLSys Conference, San Jose, CA, USA, 2021. Copyright 2021, 16 pages.

Handley, Mark, et al., "Re-architecting datacenter networks and stacks for low latency and high performance", Proceedings of SIGCOMM '17, Los Angeles, CA, USA, Aug. 21-25, 2017, https://dl.acm.org/doi/ pdf/10.1145/3098822.3098825, 14 pages.

Lao, ChonLam, et al., "ATP: In-network Aggregation for Multi-tenant Learning", USENIX, This paper is included in the Proceedings of the 18th USENIX Symposium on Networked Systems Design and Implementation. Apr. 12-14, 2021, https://www.usenix.org/system/files/nsdi21-lao.pdf, 22 pages.

Liu, Shuo, et al., "NetReduce: RDMA-Compatible In-Network Reduction for Distributed DNN Training Acceleration", https://arxiv.org/pdf/2009.09736.pdf, Sep. 21, 2020, 15 pages.

Sapio, Amedeo, et al., "Scaling Distributed Machine Learning with In-Network Aggregation", USENIX, This paper is included in the Proceedings of the 18th USENIX Symposium on Networked Systems Design and Implementation, Apr. 12-14, 2021, https://www.usenix.org/system/files/nsdi21-sapio.pdf, 25 pages.

International Search Report and Written Opinion for PCT Patent Application No. PCT/US22/42362, Mailed Dec. 14, 2022, 12 pages.

\* cited by examiner

Example Reduce-scatter pseudocode

```
1  n = number of workers
2  m = total slots in the pool are allocated to a particular job.
3  pool[2, i], count[2, i], bitmap[2,i,n] = 0, i is the pool index
4  Upon receive p(pool_index_start_point, wid, psn, data)
5  s.pool_id = (p.psn/m)%2;
6  s.pool_index = p.psn%m + p.pool_index_start_point;
7  if bitmap[s.pool_id, s.pool_index, p.wid] == 0 then
8      bitmap[s.pool_id, s.pool_index, p.wid]=1
9      counter[s.pool_id, s.pool_index] ++;
10     if counter[s.pool_id, s.pool_index] == 1 then
11         pool[s.pool_id, s.pool_index] = p.data
12     else
13         pool[s.pool_id, s.pool_index] += p.data
14     if counter[s.pool_id, s.pool_index] == n then
15         p.data = pool[s.pool_id, s.pool_index];
16         p.wid = counter[s.pool_id, s.pool_index]
17         send it;
18         counter[(s.pool_id+1)%2, s.pool_index] = 0;
19         bitmap[(s.pool_id+1)%2, s.pool_index] = 0;
20     else
21         remove p.data from p; forward it
22 else
23     if counter[s.pool_id, s.pool_index] == n then
24         p.data = pool[s.pool_id, s.pool_index];
25         p.wid = counter[s.pool_id, s.pool_index]
26         forward it;
27     else
28         remove p.data from p; forward it;
```

FIG. 5

Example Allgather pseudocode

```
1  n = number of workers
2  m = total slots in the pool are allocated to a particular job.
3  pool[2, i], count[2, i], bitmap[2,i,n]= 0, i is the pool index
4  Upon receive p(pool_index_start_point, wid, psn, len, data)
5  s.pool_id = (p.psn/m)%2;
6  s.pool_index = p.psn%m + p.pool_index_start_point;
7  if bitmap[s.pool_id, s.pool_index, p.wid] == 0 then
8      if counter[s.pool_id, s.pool_index] == 0 then
9          if p.len == 0 then
10             drop it;
11         else
12             pool[s.pool_id, s.pool_index] = p.data;
13             forward it;
14             bitmap[s.pool_id, s.pool_index, p.wid]=1
15             counter[s.pool_id, s.pool_index] ++;
16     else
17         if p.len == 0 then
18             p.data = pool[s.pool_id, s.pool_index];
19             forward it;
20             bitmap[s.pool_id, s.pool_index, p.wid]=1
21             counter[s.pool_id, s.pool_index] ++;
22         else
23             //this case would not happen;
24     if counter[s.pool_id, s.pool_index] == n then
25         counter[(s.pool_id+1)%2, s.pool_index] = 0;
26         bitmap[(s.pool_id+1)%2, s.pool_index] = 0;
27 else
28     if p.len == 0 then
29         p.data = pool[s.pool_id, s.pool_index];
30     forward it;
```

FIG. 7

NETWORK INTERFACE DEVICE-BASED COMPUTATIONS

BACKGROUND

Existing in-network computation solutions for distributed deep neural network (DNN) training, such as Sapio et al., "Scaling Distributed Machine Learning with In-Network Aggregation," 18th USENIX Symposium on Networked Systems Design and Implementation (NSDI '21) (SwitchML) and Lao et al., "ATP: In-network Aggregation for Multi-tenant Learning" (NSDI '21) (ATP), propose dropping packets to reduce network traffic if the switch processes the packets. However, dropping packets can break a connection, e.g., remote direct memory access (RDMA) reliable connection (RC) (RDMA RC). FIG. 1 shows Traditional End-to-End Solution for machine learning (ML) training using a parameter server (PS) architecture.

The PS architecture includes workers 100 and parameter servers (PS) 120 that are communicatively coupled using switches 110. An end-to-end solution for PS architecture includes reduce-scatter and Allgather operators. When a job starts, if the system uses the RDMA RC as the network transport protocol, a worker sets up an RC queue pair with at least one PS. FIG. 1 shows Worker1 has three QPs, and the QPs connect to a PS. Worker2 and Worker3 also utilize three QPs, and the QPs connect to a PS.

In the reduce-scatter operator, a worker sends a partition of the data to a corresponding parameter server. For example, partition a1 from Worker1, a2 from Worker2 and a3 from Worker3 are sent to PS1, partition b1 from worker1, b2 from worker2, and b3 from worker3 are sent to PS2 and similar pattern applies to the PS3. As a result, the data are scattered across multiple parameter servers to leverage the parallel computation of graphics processing units (GPUs) located at a parameter server. After receiving the data, the PS first performs aggregation over the data from the workers. Next, the PS utilizes a GPU to perform computation, e.g., optimization over the aggregated data. Note that the parameter servers and workers can be implemented as processes, which can be executed at a same machine or same GPU. Network incast can arise from multiple network interface devices sending communications to a single network interface device, which becomes congested due to excessive received packet traffic.

In the Allgather operator, the data that are processed by a GPU are multicast to the workers. A parameter server sends the same copy of the data to the workers. In this process, the bandwidth from one parameter server is distributed to all the workers, and the network could be the bottleneck.

RDMA RC is connection-based and tracks received packets at the end host. If a packet does not arrive at the receiver, packet retransmission can be triggered. The connection semantic breaks when the in-network computation if a switch processes packet, instead of a host, and drops the packet intentionally to reduce the network traffic. Thus, if an expected packet is not received at an end-host receiver, the end host is not able to distinguish if the switch consumes packet intentionally or the network drops the packet due to the buffer overflow or corruption.

BRIEF DESCRIPTION OF THE DRAWINGS

FIG. 5 depicts an example pseudo code of a reduce-scatter operation at a network interface device.
FIG. 7 depicts an example pseudocode of operations to perform an Allgather operation.

DETAILED DESCRIPTION

Figure 1:
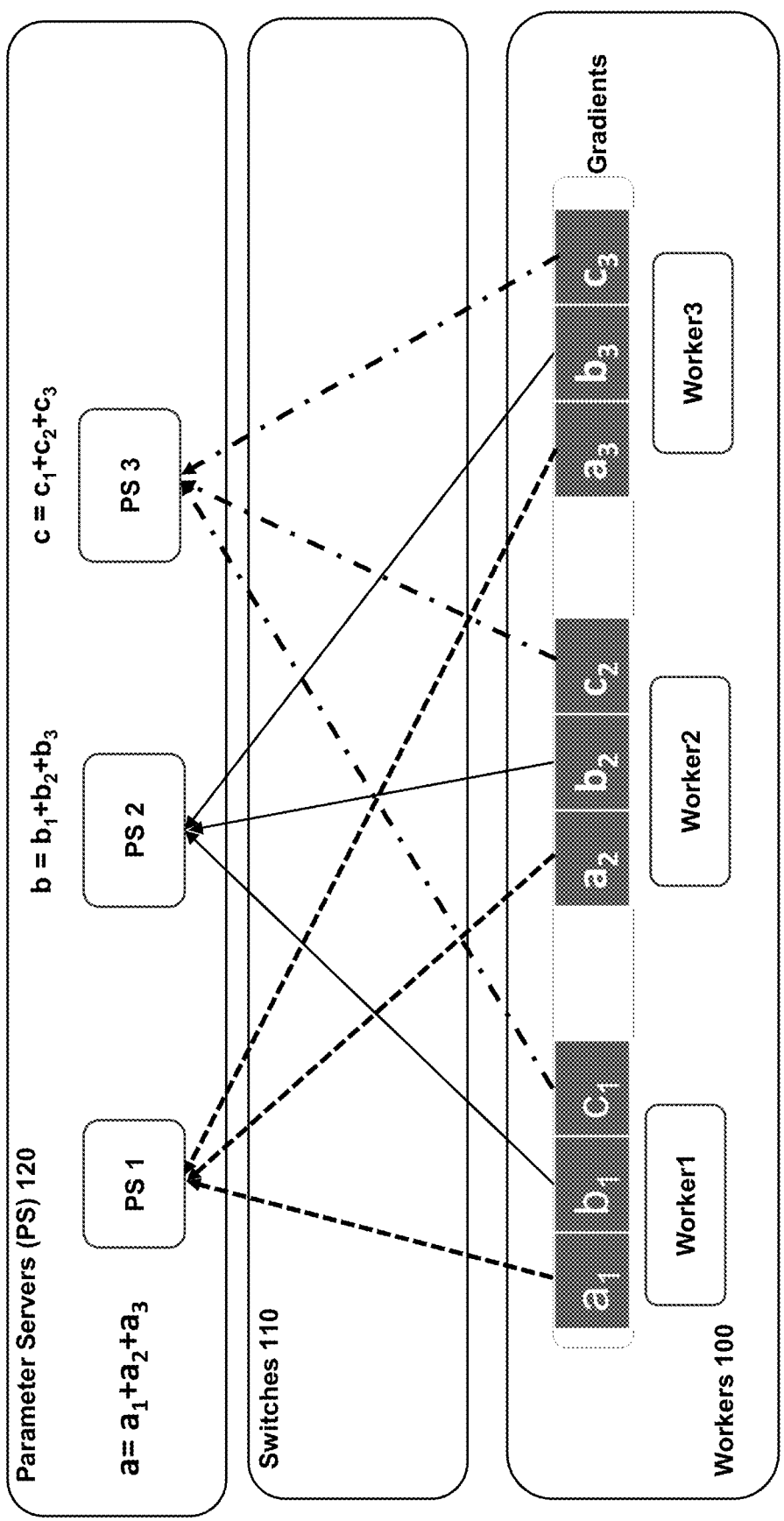
FIG. 1 depicts an example system.

If an end-to-end connection breaks by a network interface device processing packets, an end-point is unable to detect a reason that an expected packet is not received, because the packet was not received by the end-point. Some examples attempt to maintain an RDMA RC connection and allow a network interface device to perform packet processing associated with training and inference operations for distributed deep neural network (DNN), machine learning (ML), or machine learning frameworks based on SwitchML, ATP, or others. A packet payload can be processed by the network interface device and the packet header can be processed by an endpoint receiver host for protocol processing. Some examples split the application data processing and transport protocol processing between a respective network interface device and an endpoint host or end host network interface device, whose RoCEv2 implementation is well-verified.

Changes to implementations of workers and parameter servers can be small or none by maintaining a workflow of a PS architecture as workers and parameter servers do not request or cause the use of data processing and transport protocol processing between a respective network interface device and an endpoint host or end host network interface device (e.g., RDMA-enabled network interface controller). In some examples, a number of total workers can be encoded and conveyed in a packet header.

In some examples, a network interface device that performs computation is an endpoint network interface device. An endpoint host connected to the endpoint network interface device can maintain RDMA RC connection by managing transport state such as determining if sequential packet sequence numbers are received. The endpoint host can manage connectivity establishment and maintenance.

In some examples, programmable match-action units (MAUs) of an ingress pipeline or egress pipeline of a network interface device can perform computation on data at least in connection with reduce-scatter and Allgather processes. By leveraging programmability of the ingress pipeline or egress pipeline, reduce-scatter process causes the ingress pipeline or egress pipeline to perform an aggregation phase (e.g., summation, min-max, and so forth) and/or multicast operation of an Allgather phase. The multicast operation can involve the PS sending a full payload packet to the network interface device and with the network interface device storing the payload. The network interface device can receive a dummy packet (e.g., header with no data in a payload) from the PS and the network interface device can insert or replace the payload of the dummy packet with the stored payload to provide an updated packet and forward the updated packet to one or more worker.

In a reduce-scatter phase, one or more workers can send full payload packets to the network interface device, and the network interface device forwards header packets (e.g., packets with headers but no payload) to the PS before receiving a total number of workers' packets. When the network interface device receives the total number of workers' packets, network interface device forwards a packet with a computed results to the PS. For forwarded packets where a payload is added or removed, header fields can be updated as described herein.

In an Allgather phase, the PS can send a full payload packet (e.g., packet with header and payload) to one worker through the network interface device. Data in the full payload packet can be the same or different from the payload with computed results received from the network interface device. PS can send a set of header packets (e.g., packets with headers but not payloads) to the other workers through the network interface device. Network interface device can forward packets to workers. Network interface device can store the payload from the full payload packet and insert the stored payload into a payload of the header packets. Worker can receive at least one full payload packet. For forwarded packets where a payload is added or removed, header fields can be updated as described herein.

In a reduce-scatter phase, workers can send full payload packets to the network interface device and the network interface device forwards headers of the full payload packets (e.g., header packets) to the PS. The network interface device stores the computed result to be inserted into a header packet. For forwarded packets where a payload is added or removed, header fields can be updated as described herein.

In an Allgather phase, the PS can send header packets to the network interface device, the network interface device inserts the stored computed result from a reduce-scatter phase into the header packets, and forwards the packets with the computed results to workers. For forwarded packets where a payload is added or removed, header fields can be updated as described herein.

Figure 2:
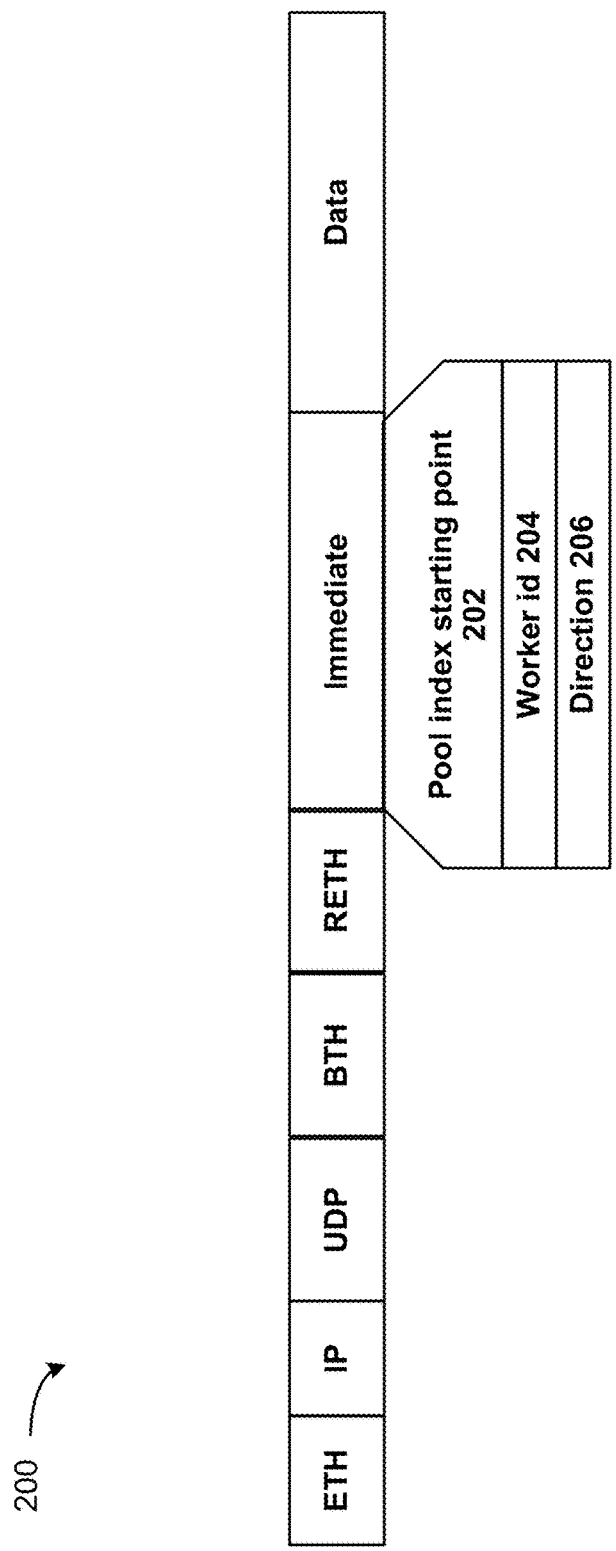
FIG. 2 depicts an example packet format that can be utilized by a sender worker or sender parameter server.

FIG. 2 depicts an example packet format that can be utilized by a sender worker or sender parameter server. Packet 200 can be implemented as RDMA over Converged Ethernet (RoCE) v2 consistent packet, although other packet formats and packet specifications can be used. For example, a RoCE v2 packet can be utilized to transmit data from a worker to a parameter server or a parameter server to worker. Supplement to InfiniBand™ Architecture Specification Volume 1 Release 1.2.1, Annex A17: RoCEv2 (2014) provides an example description of various headers in packet 200. Field Immediate can include an RDMA header that is 32 bits and incudes user defined data. In some examples, field Immediate of packet 200 can include at least pool index starting point 202, worker identifier (id) 204, and direction or operation 206.

Field pool index starting point 202 can allow support of multiple parameter servers and to attempt to avoid overlapped pool slots. To process data in a network interface device, data can be stored in a slot in memory of the network interface device. A pool can include multiple packet memory slots and field pool index starting point 202. Field pool index starting point 202 can identify a particular slot in memory that is to store data of the packet that is an offset from a starting point computed based on packet sequence number in the BTH field. An endpoint sender can set a value of field pool index starting point 202 and the field can be assigned by a job scheduler (e.g., orchestrator) when or before a workload starts.

A job scheduler can share job parameters with a software defined networking (SDN) controller such as Reduction ID, rank, total number of workers. The SDN controller can assign a number of slots per reduction such as a range of memory slots, starting index that is no more than the slot number of packets in flight. Slots can be released at the end of the job In some examples, a queue pair (QP) packet sequence number (PSN) can be initialized to be zero. Based on field pool index starting point, a network interface device can calculate a slot id. A QP at a parameter server (PS) can be associated with a memory region of PS and a PS allocates a same memory region for the set of QPs. Data can be aggregated in a memory region of a switch or network interface device. PS's memory region can be used to receive aggregated data from a switch or network interface device.

Field worker id 204 can identify a particular worker that sent or received data in the packet. A receiver network interface device can utilize field worker id 204 to count a number of workers that have provided data for processing by the receiver network interface device to ensure that workers in a group of workers have supplied data for processing prior to providing processed data to a host system.

Description next turns to an example use of fielder worker id 204. Worker identifier values can be used by a network interface device to distinguish different operations and determine if workers of a group of workers have all contributed data. In some examples, a worker id can be converted to a bitmap by the network interface device. For example, the worker with ID 1 carries value of 1, which is converted to 00010. Table 2 depicts an example of conversion from worker ID to bitmap. Bitmaps can be added to track a number of workers that have sent packets to the network interface device.

TABLE 2

| Worker ID | Bitmap |
|---|---|
| 0 | 00001 |
| 1 | 00010 |
| 2 | 00100 |
| 3 | 01000 |
| 4 | 10000 |

Data contribution tracking from workers can take place by adding bitmaps associated with workers that have contributed data to the network interface device. In this example, contributions of 5 workers are tracked. Table 3 depicts an example of counting of data contributions by workers.

TABLE 3

| Slot ID | Bitmap | Counter | Aggregator value field |
|---|---|---|---|
| 1 | 00101 | 2 | Data |
| 2 | 00000 | 0 | No data |
| 3 | 00111 | 3 | Data |
| 4 | 01101 | 3 | Data |
| 5 | 10101 | 3 | Data |

Column Slot ID can be a memory slot to use to store data resulting from a computation operation by the network interface device. A slot has an associated bitmap to track the number of workers that have contributed data to the computation. Column counter can be used track how many different workers are provided data to be used in the computation. For example, a computation can include sum, write, or read.

In this example in Table 3, 5 slots are used to store data aggregated from 5 workers. Slot ID=1 has received data from two workers (e.g., workers 0 and 2), slot ID=2 has received no data, slot ID=3 has received data from three workers (e.g., workers 0-2), and so forth. After data has been received from workers 0-4, a computation operation can be performed and the resulting computation can be copied from the memory slot associated with the slot ID and sent to the host. Aggregated computation data can be stored in a register or memory prior to being copied or sent to the host.

A network interface device can inform an orchestrator of memory addresses or slots available to store packet data. The orchestrator can oversee memory use in the network interface device. The field pool index start point and worker identifier fields can be assigned by the orchestrator and conveyed to the endpoint sender. When a job starts, the orchestrator can allocate the memory region, e.g., register range, to one or more associated PS(s), and allocate the worker id to the associated worker(s). In some examples, the immediate field can be populated by a sender worker or sender PS for a write or WRITE-ONLY request.

Field direction 206 can include an operation for the network interface device to perform on data received in a packet. For example, a value of 0 can indicate a reduce-scatter operation is to be performed. A value of 1 can indicate an Allgather operation is to be performed. Other operations can be performed such as Allreduce, which can be a combination of ReduceScatter and Allgather.

Figure 3:
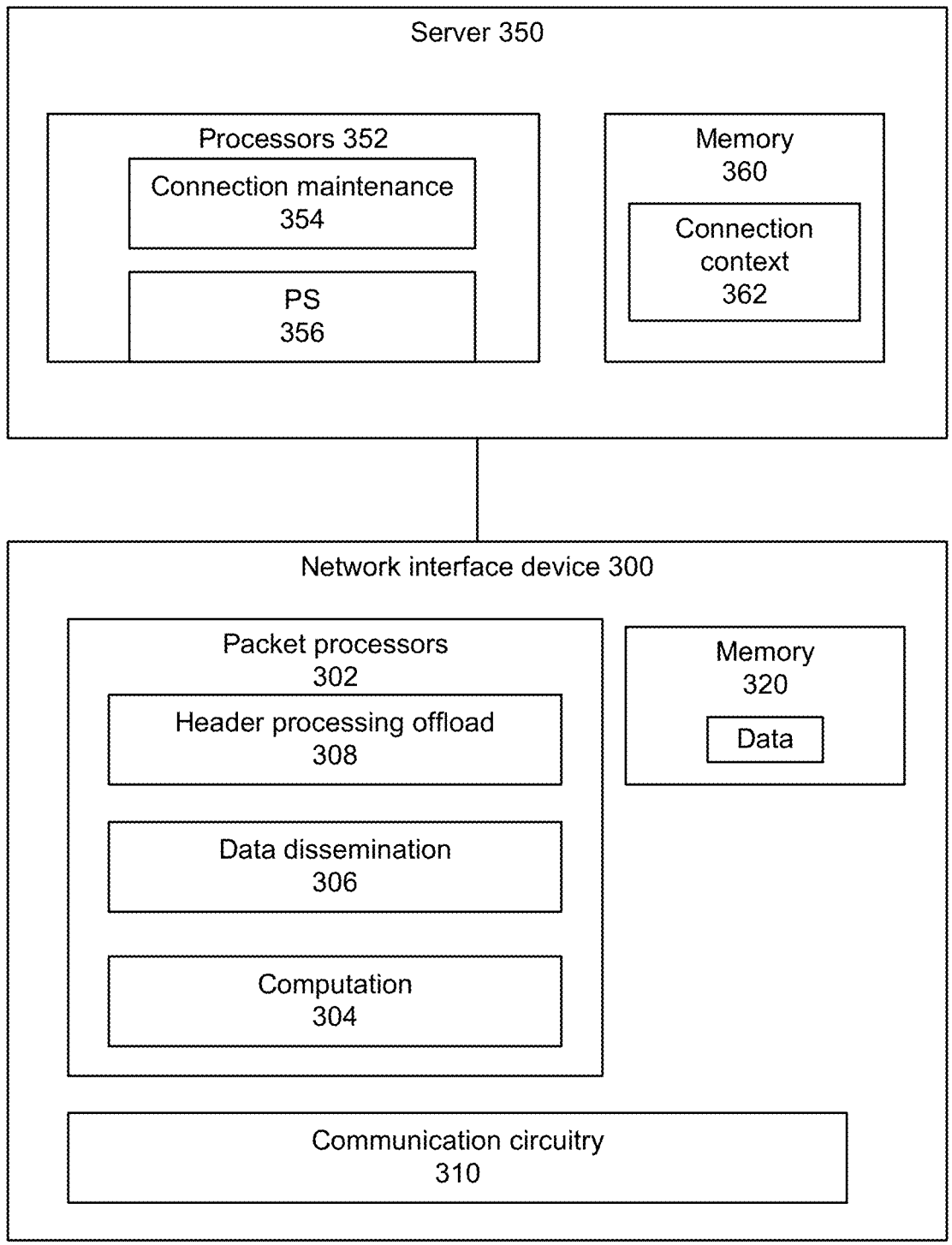
FIG. 3 depicts an example system.

FIG. 3 depicts an example system. The system can part of a distributed ML or DNN system that is trained or performs inferences consistent with SwitchML, Message Passing Interface (MPI), Symmetric Hierarchical Memory Access (SHMEM), Unified Parallel C (UPC), or others. Network interface device 300 can be implemented as one or more of: network interface controller (NIC), SmartNIC, router, switch, forwarding element, infrastructure processing unit (IPU), data processing unit (DPU), network-attached appliance (e.g., storage, memory, accelerator, processors, security), and so forth. Communication circuitry 310 can provide communications with other devices over a network or fabric via one or more ports. Communication circuitry 310 can may be configured to use any one or more communication technology (e.g., wired or wireless communications) and associated protocols (e.g., Ethernet, InfiniBand®, Bluetooth®, Wi-Fi®, 4G LTE, 5G, etc.) to perform such communication. Communication circuitry 310 can include one or more network hardware resources, such as ingress queues, egress queues, crossbars, shared memory switches, media access control (MAC), physical layer interface (PHY), Ethernet port logic, and other network hardware resources.

Network interface device 300 can utilize packet processors 302 to process received packets and to prepare packets for transmission. For example, computation 304 can perform one or more of: summation of packet data with other packet data from other workers, multiplication, division, min-max, or other data computation operations related to Allreduce, ReduceScatter, or Allgather. Packet header and data can be stored in memory 320.

Data dissemination 306 can perform distribution of data generated by computation 304 from a PS to one or more associated workers or from one or more associated workers to a PS in accordance with Allreduce, ReduceScatter, or Allgather.

Header processing offload 308 can send or copy packet headers via a packet and/or direct memory access (DMA) copy operation to a server 350 executing a PS. Operation of packet processors 302 can be programmed using P4, C, Python, Broadcom Network Programming Language (NPL), or x86 compatible executable binaries or other executable binaries.

Server 350 can be coupled to network interface device 300 using a device interface or network connection, examples of which are described herein. Server 350 can include processors 352, memory 360, and other technologies described herein at least with respect to the system of FIG. 10. Offload connection maintenance 354 can manage connections between workers (not shown) and PS 356 based on RDMA RC. For example, connection maintenance 354 can acknowledge packet receipt to a sender and identify if a packet sequence number is not received from a sender and request packet re-transmission based on connection context 362 stored in memory 360.

Figure 4:
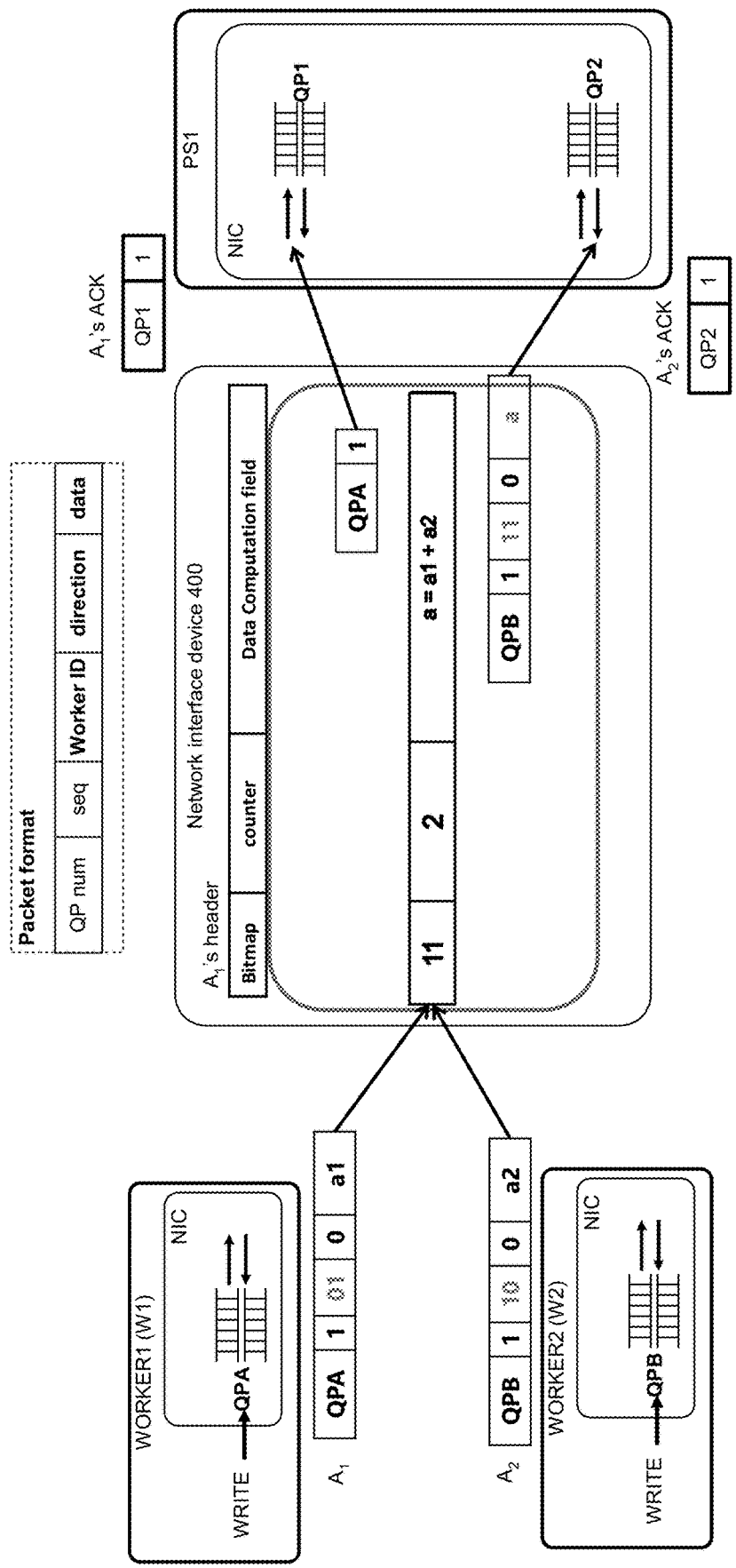
FIG. 4 depicts an example operation of a reduce-scatter operation.

FIG. 4 depicts an example operation of a reduce-scatter operation. An RDMA RC connection can be set up among workers worker1 and worker2 and parameter server PS1. Although examples herein are described with respect to RDMA RC, other reliable transport protocols can be used such as Amazon SRD, ANR2.0, or others. In an ML framework and in connection with training or inference, worker1 and worker2 can provide data (e.g., gradients or coefficients) to PS1. PS1 can represent an endpoint.

In a reduce-scatter operation, network interface device 400 sums data and sends data (after receiving data from worker1 W1 and worker2 W2) to PS1. In some examples, W1 sets up an RC connection with QP1 at PS1 and W2 sets up an RC connection with QP2 at PS1. Note that this example is a subset of aggregation from a job. In some examples, there can be as many parameter servers as many as numbers of workers. Packet A1 from W1 arrives at network interface device 400 and A1's data is stored. Network interface device 400 updates a worker counter to reflect receipt of data from W1, and forwards the header to QP1. PS1's network interface controller (NIC) sends an ACK packet to the W1.

Packet A2 from W2 arrives at network interface device 400 and network interface device 400 performs aggregation. Because there are total of two workers, the aggregation is complete. Network interface device 400 writes the aggregated data, e.g., a=a1+a2, to the packet A2 and forwards A2 to the QP2 at PS1. Then, the PS1's NIC sends an ACK for A2 to the W2. Network interface device 400 sends headers of A1 and QP2 to PS1 so that PS1 maintains the RC connection with W1 and W2. Payload processing at network interface device 400 helps reduce network traffic to the PS1.

FIG. 5 depicts an example pseudo code of a reduce-scatter operation that can be performed at a network interface device. Packets transmitted by a worker can be formatted with immediate data that includes operation type (direction), worker id, and pool index starting point. A total outstanding packet number may be no larger than the total buffer size that the network interface device allocated to it.

When a job starts, a job scheduler allocates a m total slots to a particular job and configure the switch for the total number of n workers (line 1). The job scheduler allocates m more slots to serve a shadow pool described in SwitchML. A slot can be associated with one bitmap and a counter.

Based on receipt of a packet, the network interface device extracts the worker id, pool_index_start_point or slot id, packet sequence number (psn), and data. Then, it calculates the pool index and pool id from packet sequence number and pool_index_start_point, and store them in metadata, denoted as s.pool_id and s.pool_index. Network interface device checks if the packet has been aggregated before. If the packet has not been aggregated before (e.g., line 7), the network interface device sets the bitmap and increases the counter (e.g., lines 8 and 9). If the counter shows this is the first packet, it stores the data to the register (e.g., lines 10 and 11); else, the network interface device performs aggregation (e.g., line 13).

If the counter shows that the aggregation is completed, network interface device copies the aggregated data and counter value for inclusion in the packet and sends the packet (e.g., lines 15-17), which will be forwarded as the default network interface device routing suggested. At the same time, network interface device clears the counter and bitmap for the shadow pool with the same pool_index (e.g., lines 18-19).

If the counter shows that the aggregation is not done yet, network interface device removes the payload from the packet, and sends only the header (e.g., as a dummy packet) (e.g., lines 20-21) to the corresponding PS with the default routing algorithm. If a worker contribution bitmap shows that the packet has been aggregated (e.g., line 22) and if the aggregation is done, the network interface device allocates the aggregation in a payload and bitmap to the packet and forwards the packet (e.g., lines 24-26) to the corresponding parameter server. Else, if the aggregation is not done, the network interface device removes the payload from the packet and forward the packet (e.g., lines 27-28).

In some examples, for a received packet with header and payload that is forwarded as a dummy packet with the received packet header or a dummy packet is modified to include a payload, a length field in an Internet Protocol (IP) header, a length field in a User Datagram Protocol (UDP) header, and/or a length field in an RDMA extended header (RETH) can be modified by a network interface device to indicate the resulting packet length of the dummy packet. For example, when a network interface device performs in-network compute on a received packet and forwards a header in a dummy packet, one or more of the three fields can be changed to indicate the length of the dummy packet. For example, the length field in the RETH header can be set to zero. When the network interface device receives a dummy packet and adds a payload, one or more of the three fields can be changed to indicate the length of the dummy packet with added payload. For example, the length field in the RETH header can be set to the payload length.

An example operation of a Parameter Server is described next. PS can allocate a same memory region for a set of QPs whose data is to be aggregated. With this memory allocation, a memory region can be allocated for a set of QPs whose data is to be aggregated. When the PS receives aggregated data, PS continues the next operation of the computation. Note that even in the case that the dummy packet (e.g., the packet header) arrives later than the full aggregated data, the PS distinguishes the dummy packet because the dummy packet does not contain any data field in the packet. It is also possible that more than one full aggregated data packet will arrive at the same memory region.

In some examples, the PS's NIC performs packet receipt acknowledgement (ACK) and retransmission requests. Note that if the PS receives a dummy packet (e.g., packet header) or full packet, the PS's NIC sends an ACK to the worker. If the worker's NIC receives the ACK, the NIC determines that the packet was delivered to the destination. If the worker's NIC does not receive the ACK, the worker's NIC retransmits a packet. Some examples split the application data processing and the transport layer processing among the network interface device and PS's NIC.

The following describes examples of various packet loss scenarios for verification. Note that packet loss causes can be packet corruption, network congestions or any other reasons.

If packet A1 from W1 is lost, W1 receives a NACK and retransmits A1. If at that time, A2 has been received by the network interface device, it is the last packet and thus, the network interface device writes the aggregated data to A1 and forwards A1 to the PS, otherwise, the network interface device forwards the A1's header to the PS. In this scenario, PS only receives one copy of the aggregated result data.

In a case where packet A1's header from network interface device is provided to PS's QP1 but is not received by PS's NIC, PS's NIC requests packet A1 to be retransmitted. If packet A2 arrives at the network interface device, the aggregation is completed, and thus, the network interface device writes the aggregated result to A1 and forwards the aggregated result in A1 to PS. PS receives two copies of the aggregated result data. If A2 has not arrived at the network interface device when the retransmitted A1 arrives at the network interface device, this is not the last packet, the network interface device drops the payload and forwards the header of A1 to the PS (line 28 in FIG. 5).

In a case where packet A2 sent to PS's QP2 is lost, aggregated data is lost. In this case, a worker's NIC retransmits A2. The network interface device performs aggregation, and the network interface device writes the aggregated result to re-transmitted A2 and forwards re-transmitted A2 to PS. The PS receives one copy of aggregated data.

In a case where an ACK to W1 is lost, the PS's NIC causes retransmission of packet A1. If packet A2 arrives at the network interface device, the aggregation is complete, and the network interface device writes the aggregated data into packet A1 and forwards packet A1 to the PS. PS receives one copy of the aggregated data, from packet A2, because this retransmitted copy of data can be dropped by PS's NIC as the same sequence of packet has received already. If A2 has not arrived at the network interface device when the retransmitted A1 arrives at the network interface device, the network interface device can drop the payload and forward the header of A1 to the PS (e.g., line 28 in FIG. 4).

In a case where an ACK to W2 is lost, the PS's NIC causes retransmission of packet A2. The aggregation is completed and the network interface device writes the aggregated result into packet A2 and forwards packet A2 to PS. The PS's NIC receives two copies of the data, as the same sequence of the packet has been received, and the PS's NIC drops the retransmitted packet. The PS accesses one copy of the aggregated data.

Figure 6:
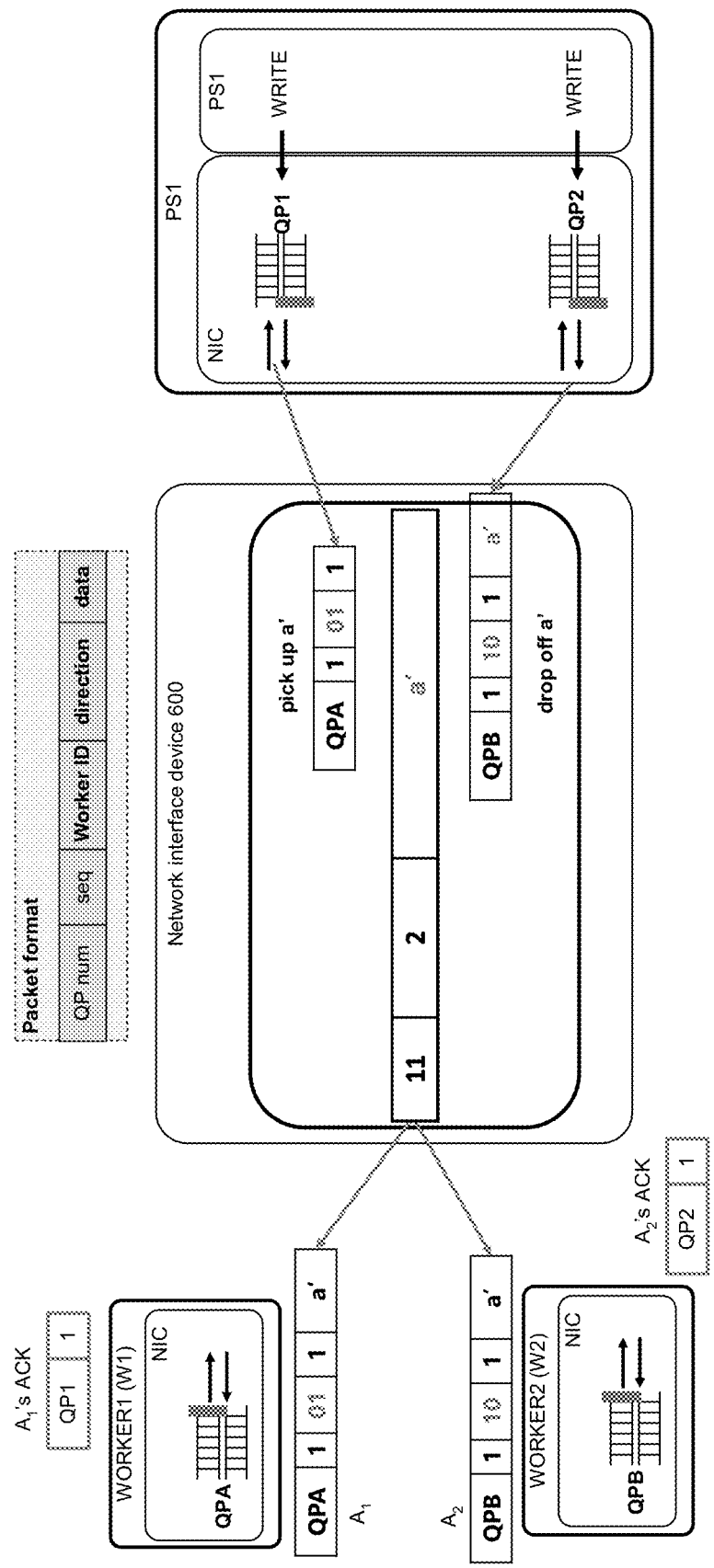
FIG. 6 depicts an example system that can perform an Allgather operation.

FIG. 6 depicts an example of an Allgather operation. An Allgather operation can distribute results from PS1 to workers W1 and W2. In an Allgather operation, PS1 sends one copy of data to network interface device 600 to distribute to workers W1 and W2 by sending the data in one packet to network interface device 600 and sends dummy packets to network interface device 600 to forward to the rest of the workers (e.g., W2). PS1 can send one copy of the aggregated data to the network interface device 600 to send to a worker and PS1 sends packet header, e.g., the zero-payload RDMA WRITE Only request, to network interface device 600 to append to the aggregated data and send to the other worker(s). PS1 sends packets encoded with the worker id.

PS1 first sends the data, a', from QP2 to network interface device 600. Network interface device 600 stores the data a' (drop off a') and forwards the packet to W2. PS1 sends a dummy packet with a packet header from QP1 but no payload a' to network interface device 600 to forward to W1. However, the network interface device 600 appends the payload a' (pick up a') to the packet header and forwards the constructed packet to W1.

If the starting packet sequence numbers (PSN) from different hosts are the same, it might cause the conflicts on the network interface device slots from different parameter servers using the same pool_index. Use of the pool_index_start_point can avoid conflicts on the network interface device slots.

In some examples, network interface device 600's built-in multicast group is not configured for use to send a' to W1 and W2. Use of a built-in multicast group can involve storing QP information to rewrite the packet header as the multicast replicates the same packet to different QPs and the PS's QP sends packets to maintain the connection.

FIG. 7 depicts an example pseudocode of operations to perform an Allgather operation. Upon receiving a packet, if the packet has not been received (e.g., line 7 of the pseudocode of FIG. 7), if the total number of different workers' packets that have identified is zero and packet has the full payload, network interface device stores the payload to the pool, and updates the bitmap and counter (e.g., lines 11-15 of the pseudocode of FIG. 7). If the total number of different workers' packets that have identified is zero, and the packet's length is zero, e.g., the dummy packet, network interface device drops this packet (e.g., lines 9-10 of the pseudocode of FIG. 7).

If the total number of different packets that have be identified is larger than zero and the packet length is zero, the network interface device appends the data from the pool to the dummy packet and updates the bitmap and counter (e.g., lines 17-21 of the pseudocode of FIG. 7). If the total number of different packets that have been identified is the total number of workers, the network interface device resets the bitmap and counter for its corresponding shadow pool slot (e.g., lines 24-26 of the pseudocode of FIG. 7).

If the packet has been identified, and if it is a dummy packet, the network interface device writes the data from the pool to the payload of the packet. The network interface device forwards the packet (e.g., lines 27-30 of the pseudocode of FIG. 7).

The following describes various packet loss scenarios. In a scenario where a full payload packet from QP2 drops on the path from PS1 to network interface device, the dummy packet can be received at the network interface device first. Upon the network interface device receiving these dummy packets, the network interface device drops them (e.g., lines 8-10 of the pseudocode of FIG. 7).

In a scenario where a full payload packet from QP2 is dropped on a path from the network interface device to W2, the PS1's NIC retransmits the packet from QP2, and the network interface device forwards the packet to Q2 (e.g., line 30 of the pseudocode of FIG. 7).

In a scenario where a dummy packet is dropped on a path from PS1 to the network interface device, the PS1's NIC retransmits the dummy packet from QP1 and the network interface device writes a payload to the dummy packet and forward the packet (e.g., lines 17-21 of the pseudocode of FIG. 7).

In a scenario where a dummy packet is dropped on a path from network interface device to W1, the PS1's NIC retransmits the dummy packet from QP1, the network interface device writes the payload to the packet and forwards packet with the payload to W1 (e.g., lines 28-30 of the pseudocode of FIG. 7).

In a scenario where two packets from the network interface devices to different workers are dropped, the two packets are retransmitted (e.g., line 28-30 of the pseudocode of FIG. 7).

Figure 8A:
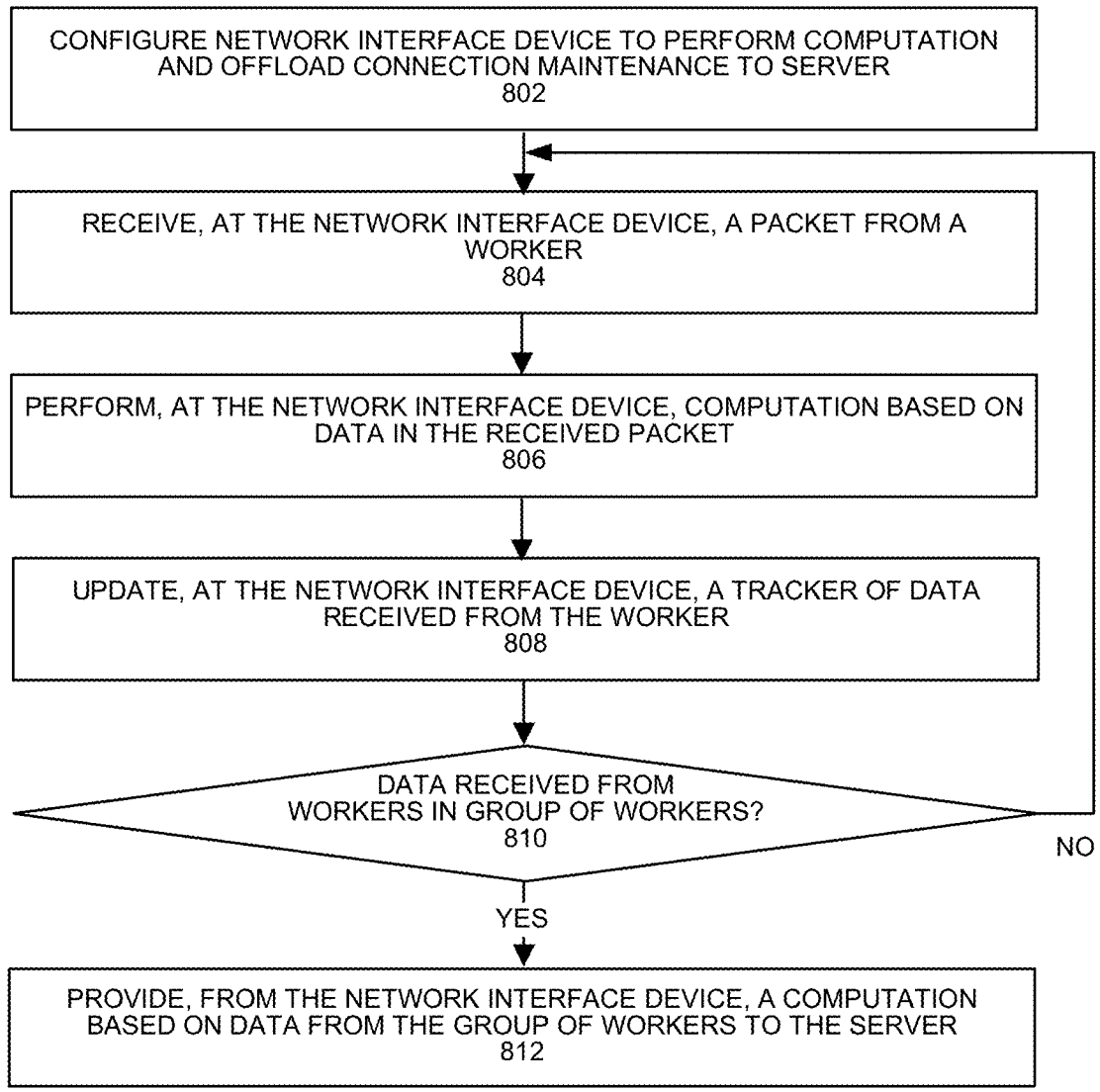
FIGS. 8A and 8B depict example processes.

FIG. 8A depicts an example process that can performed at a network interface device. At 802, a network interface device can be configured to perform computation related to at least ReduceScatter, Allgather, or Allreduce for data from workers on behalf of a server. In some examples, the server can be a parameter server. In some examples, the network interface device can be configured to perform data computations (e.g., summation, subtraction, min-max, or other algebraic operations) on data received in packets. In some examples, the network interface device can be configured to forward headers of received packets to the parameter server to offload connection maintenance to the parameter server.

At 804, the network interface device can receive a packet from a worker. The packet can indicate a pool index starting point, identify a worker that sent the packet, and a direction of operation to perform on the data. At 806, the network interface device can perform a computation on the received data based on the indicated operation to perform on the data. In some examples, the data can include a gradient or coefficient, or other values in connection with ML or DNN training or inference. The network interface device can store a result of the computation into a memory slot identified based on the pool index starting point. At 808, the network interface device can update a tracker of which worker contributed data. For example, the network interface device can count unique workers in a group of workers associated with the operation that have contributed data. At 810, a determination can be made if all of the workers in the group of workers associated with the operation have contributed data. Based on all of the workers in the group of workers associated with the operation have contributed data, the process can proceed to 812, where network interface device can send a packet to the parameter server with an aggregate computation determined based on data from workers in the group of workers associated with the operation. Based on less than all of the workers in the group of workers associated with the operation have contributed data, the process can proceed to 804.

Figure 8B:
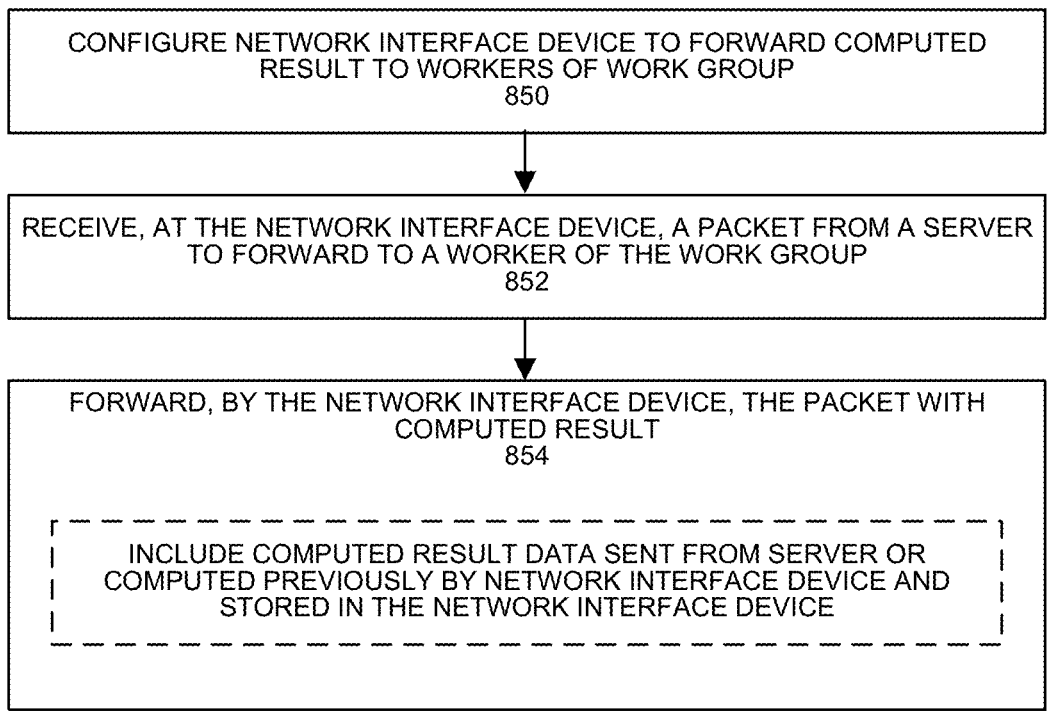

FIG. 8B depicts an example process that can performed at a network interface device. At 850, a network interface device can be configured to perform distribution of computed results from a parameter server or the network interface device related to at least ReduceScatter, Allgather, or Allreduce to workers on behalf of a parameter server. In some examples, the network interface device can be configured to perform data computations (e.g., summation, subtraction, min-max, or other algebraic operations) on data received in packets.

At 852, the network interface device can receive computed result data in a packet from a server to send the computed result data to workers in a worker group. At 854, the network interface device can receive a packet with no data (dummy packet) from the server and the network interface device is to include the computed result data to the dummy packet to send the computed result data to a worker identified in the header of the dummy packet.

In some examples, the computed result data may be stored in the network interface device and the server can send a dummy packet to the network interface device targeted to workers of the work group and the network interface device can include the computed result data in the received dummy packet and forward the dummy packet with the computed result data to the worker.

Figure 9A:
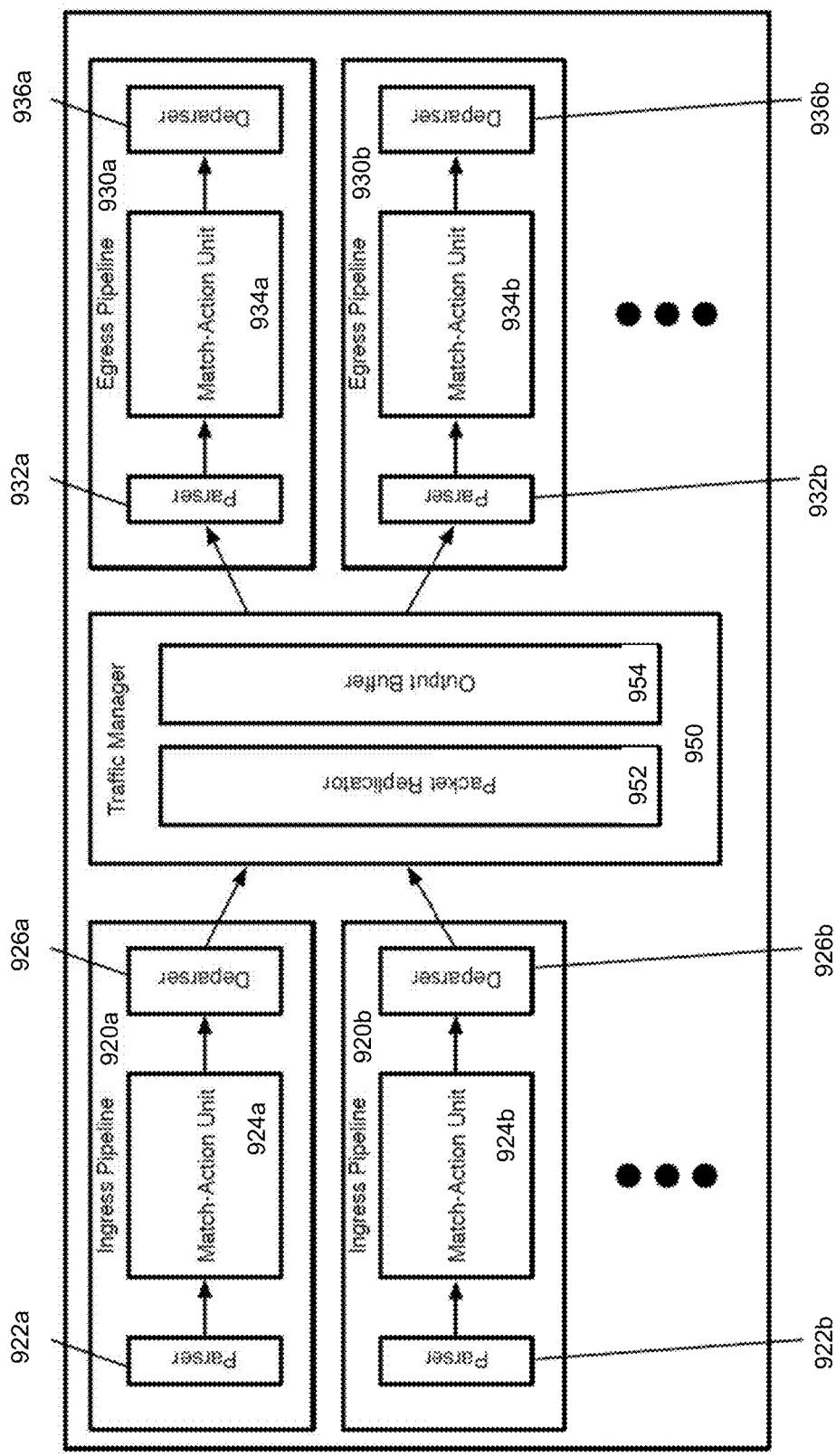
FIG. 9A depicts an example network interface device.

FIG. 9A depicts an example network forwarding system that can be used as a network interface device or router. For example, FIG. 9 illustrates several ingress pipelines 920, a traffic management unit (referred to as a traffic manager)

950, and several egress pipelines 930. Though shown as separate structures, in some examples the ingress pipelines 920 and the egress pipelines 930 can use the same circuitry resources.

Operation of pipelines can be programmed using Programming Protocol-independent Packet Processors (P4), C, Python, Broadcom NPL, or x86 compatible executable binaries or other executable binaries. In some examples, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other examples, the ingress and egress pipelines are separate circuitry. In some of these other examples, the ingress pipelines also process the non-packet data.

In some examples, in response to receiving a packet, the packet is directed to one of the ingress pipelines 920 where an ingress pipeline which may correspond to one or more ports of a hardware forwarding element. After passing through the selected ingress pipeline 920, the packet is sent to the traffic manager 950, where the packet is enqueued and placed in the output buffer 954. In some examples, the ingress pipeline 920 that processes the packet specifies into which queue the packet is to be placed by the traffic manager 950 (e.g., based on the destination of the packet or a flow identifier of the packet). The traffic manager 950 then dispatches the packet to the appropriate egress pipeline 930 where an egress pipeline may correspond to one or more ports of the forwarding element. In some examples, there is no necessary correlation between which of the ingress pipelines 920 processes a packet and to which of the egress pipelines 930 the traffic manager 950 dispatches the packet. That is, a packet might be initially processed by ingress pipeline 920b after receipt through a first port, and then subsequently by egress pipeline 930a to be sent out a second port, etc.

A least one ingress pipeline 920 includes a parser 922, a chain of multiple match-action units (MAUs) 924, and a deparser 926. Similarly, egress pipeline 930 can include a parser 932, a chain of MAUs 934, and a deparser 936. The parser 922 or 932, in some examples, receives a packet as a formatted collection of bits in a particular order, and parses the packet into its constituent header fields. In some examples, the parser starts from the beginning of the packet and assigns header fields to fields (e.g., data containers) for processing. In some examples, the parser 922 or 932 separates out the packet headers (up to a designated point) from the payload of the packet, and sends the payload (or the entire packet, including the headers and payload) directly to the deparser without passing through the MAU processing. Egress parser 932 can use additional metadata provided by the ingress pipeline to simplify its processing.

The MAUs 924 or 934 can perform processing on the packet data. In some examples, the MAUs includes a sequence of stages, with each stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, using MAU(s), packet processing, receipt of worker data, forward a packet header from a worker to a server, or insertion of computed result data into packets to be sent to workers, as described herein.

The deparser 926 or 936 can reconstruct the packet using the PHV as modified by the MAU 924 or 934 and the payload received directly from the parser 922 or 932. The deparser can construct a packet that can be sent out over the physical network, or to the traffic manager 950. In some examples, the deparser can construct this packet based on data received along with the PHV that specifies the protocols to include in the packet header, as well as its own stored list of data container locations for each possible protocol's header fields.

Traffic manager 950 can include a packet replicator 952 and output buffer 954. In some examples, the traffic manager 950 may include other components, such as a feedback generator for sending signals regarding output port failures, a series of queues and schedulers for these queues, queue state analysis components, as well as additional components. Packet replicator 952 of some examples performs replication for broadcast/multicast packets, generating multiple packets to be added to the output buffer (e.g., to be distributed to different egress pipelines).

The output buffer 954 can be part of a queuing and buffering system of the traffic manager in some examples. The traffic manager 950 can provide a shared buffer that accommodates any queuing delays in the egress pipelines. In some examples, this shared output buffer 954 can store packet data, while references (e.g., pointers) to that packet data are kept in different queues for each egress pipeline 930. The egress pipelines can request their respective data from the common data buffer using a queuing policy that is control-plane configurable. When a packet data reference reaches the head of its queue and is scheduled for dequeuing, the corresponding packet data can be read out of the output buffer 954 and into the corresponding egress pipeline 930.

Figure 9B:
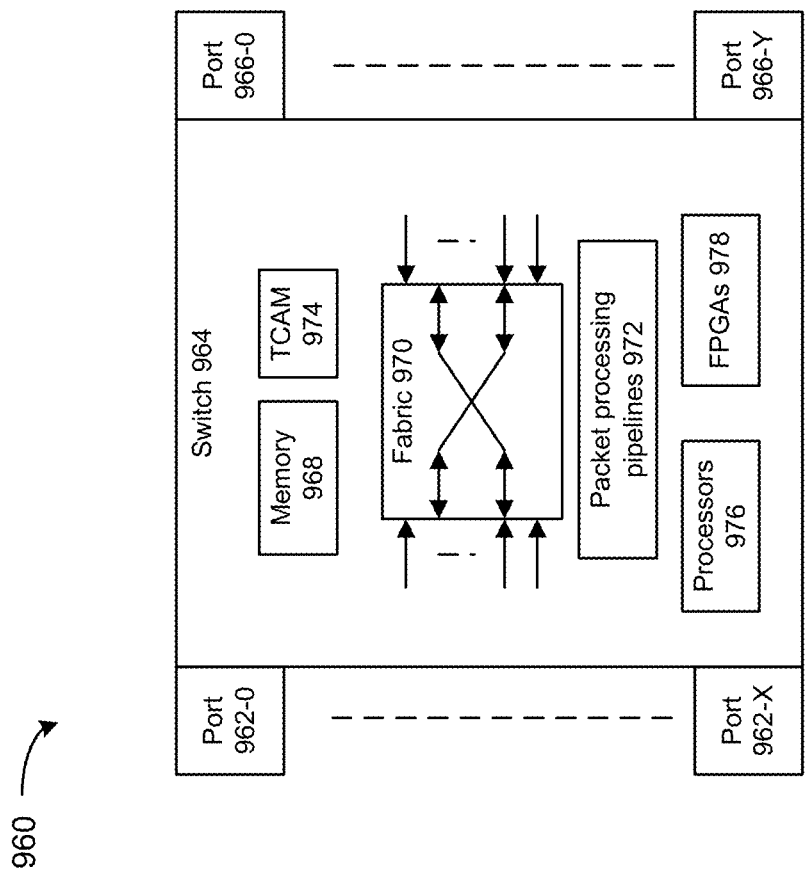
FIG. 9B depicts an example switch.

FIG. 9B depicts an example switch. Various examples can be used in or with the switch to perform in-network computation, dummy packet forwarding or modification to add or remove a payload, as described herein. The switch can be implemented as a system on chip (SoC). Switch 964 can route packets or frames of any format or in accordance with any specification from any port 962-0 to 962-X to any of ports 966-0 to 966-Y (or vice versa). Any of ports 962-0 to 962-X can be connected to a network of one or more interconnected devices. Similarly, any of ports 966-0 to 966-Y can be connected to a network of one or more interconnected devices.

In some examples, switch fabric 970 can provide routing of packets from one or more ingress ports for processing prior to egress from switch 964. Switch fabric 970 can be implemented as one or more multi-hop topologies, where example topologies include torus, butterflies, buffered multi-stage, etc., or shared memory switch fabric (SMSF), among other implementations. SMSF can be any switch fabric connected to ingress ports and egress ports in the switch, where ingress subsystems write (store) packet segments into the fabric's memory, while the egress subsystems read (fetch) packet segments from the fabric's memory.

Memory 968 can be configured to store packets received at ports prior to egress from one or more ports. Packet processing pipelines 972 can determine which port to transfer packets or frames to using a table that maps packet characteristics with an associated output port. Packet processing pipelines 972 can be configured to perform match-action on received packets to identify packet processing rules and next hops using information stored in a ternary content-addressable memory (TCAM) tables or exact match tables in some examples. For example, match-action tables or circuitry can be used whereby a hash of a portion of a packet is used as an index to find an entry. Packet processing pipelines 972 can implement access control list (ACL) or packet drops due to queue overflow. Packet processing pipelines 972 can be configured to perform in-network computation, dummy packet forwarding or modification to add or remove a payload, as described herein. Configuration of operation of packet processing pipelines 972, including its data plane, can be programmed using P4, C, Python, Broadcom Network Programming Language (NPL), or x86 compatible executable binaries or other executable binaries. Processors 976 and FPGAs 978 can be utilized for packet processing or modification.

Figure 10:
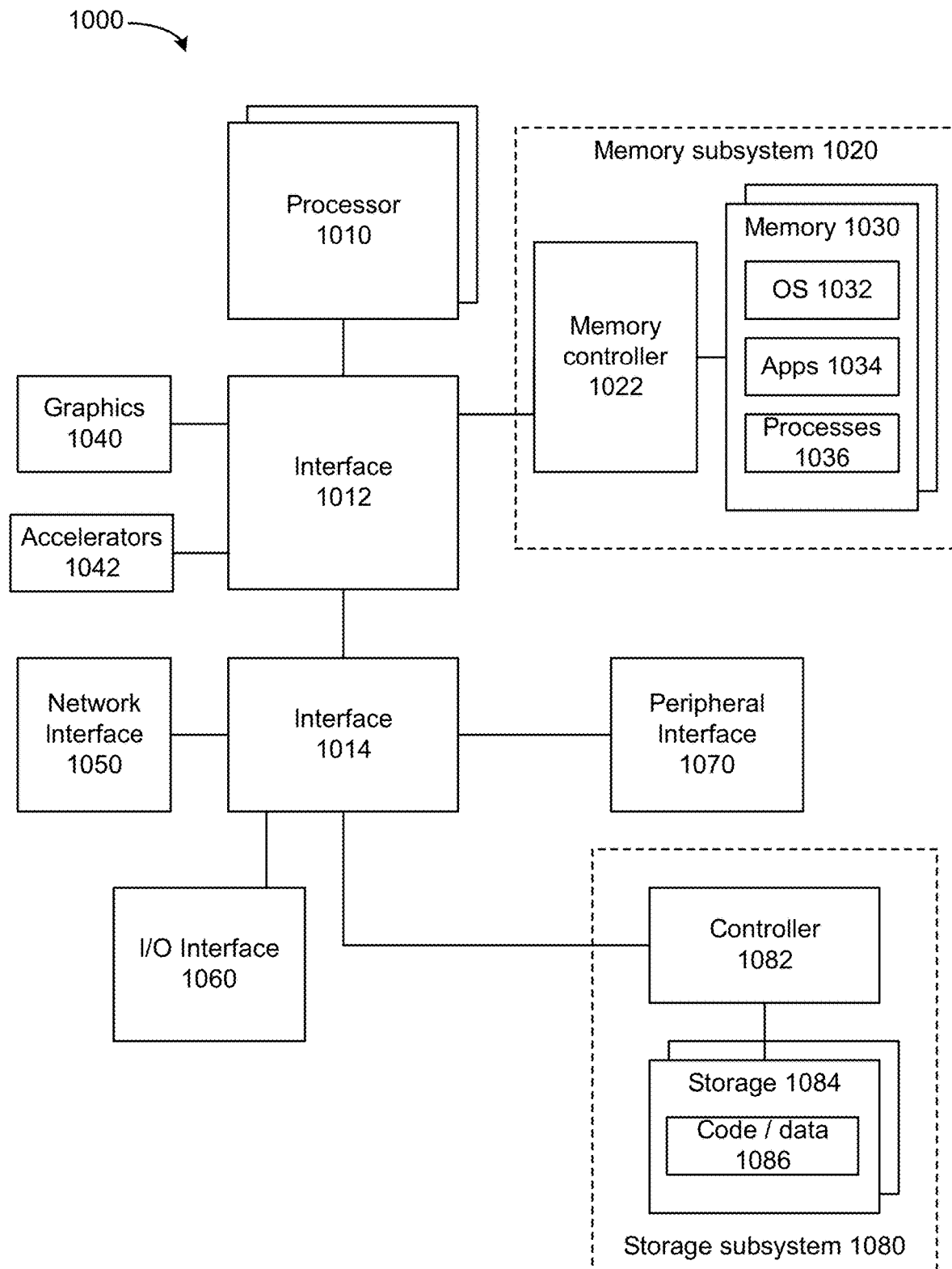
FIG. 10 depicts an example system.

FIG. 10 depicts an example computing system. Components of system 1000 (e.g., processor 1010, network interface 1050, and so forth) to perform packet processing, receipt of worker data, forward a packet header from a worker to a server, or insertion of computed result data into packets to be sent to workers, as described herein. System 1000 includes processor 1010, which provides processing, operation management, and execution of instructions for system 1000. Processor 1010 can include any type of microprocessor, central processing unit (CPU), graphics processing unit (GPU), processing core, or other processing hardware to provide processing for system 1000, or a combination of processors. Processor 1010 controls the overall operation of system 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1000 includes interface 1012 coupled to processor 1010, which can represent a higher speed interface or a high throughput interface for system components that needs higher bandwidth connections, such as memory subsystem 1020 or graphics interface components 1040, or accelerators 1042. Interface 1012 represents an interface circuit, which can be a standalone component or integrated onto a processor die. Where present, graphics interface 1040 interfaces to graphics components for providing a visual display to a user of system 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

Accelerators 1042 can be a fixed function or programmable offload engine that can be accessed or used by a processor 1010. For example, an accelerator among accelerators 1042 can provide compression (DC) capability, cryptography services such as public key encryption (PKE), cipher, hash/authentication capabilities, decryption, or other capabilities or services. In some examples, in addition or alternatively, an accelerator among accelerators 1042 provides field select controller capabilities as described herein.

In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 1042 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of system 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in system 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for system 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

In some examples, OS 1032 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can configure network interface 1050 to perform packet processing, receipt of worker data, forward a packet header from a worker to a server, or insertion of computed result data into packets to be sent to workers, as described herein, as described herein. In some examples, a driver can enable or disable offload to network interface 1050 packet processing, receipt of worker data, forward a packet header from a worker to a server, or insertion of computed result data into packets to be sent to workers, as described herein. A driver can advertise capability of network interface 1050 to perform one or more aspects of network interface 1050 to perform packet processing, receipt of worker data, forward a packet header from a worker to a server, or insertion of computed result data into packets to be sent to workers, as described herein.

While not specifically illustrated, it will be understood that system 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides system 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory.

Some examples of network interface 1050 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 1000 includes one or more input/output (I/O) interface(s) 1060. I/O interface 1060 can include one or more interface components through which a user interacts with system 1000 (e.g., audio, alphanumeric, tactile/touch, or other interfacing). Peripheral interface 1070 can include any hardware interface not specifically mentioned above. Peripherals refer generally to devices that connect dependently to system 1000. A dependent connection is one where system 1000 provides the software platform or hardware platform or both on which operation executes, and with which a user interacts.

In one example, system 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (e.g., the value is retained despite interruption of power to system 1000). Storage 1084 can be generically considered to be a "memory," although memory 1030 is typically the executing or operating memory to provide instructions to processor 1010. Whereas storage 1084 is nonvolatile, memory 1030 can include volatile memory (e.g., the value or state of the data is indeterminate if power is interrupted to system 1000). In one example, storage subsystem 1080 includes controller 1082 to interface with storage 1084. In one example controller 1082 is a physical part of interface 1014 or processor 1010 or can include circuits or logic in both processor 1010 and interface 1014.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one example, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 1000. More specifically, power source typically interfaces to one or multiple power supplies in system 1000 to provide power to the components of system 1000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1000 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Examples herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other examples described herein can be used in connection with a base station (e.g., 3G, 4G, 5G and so forth), macro base station (e.g., 5G networks), picostation (e.g., an IEEE 802.11 compatible access point), nanostation (e.g., for Point-to-Multi-Point (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or examples. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in examples.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative examples. Furthermore, additional operations may be added or removed depending on the particular applications. Any combination of changes can be used and one of ordinary skill in the art with the benefit of this disclosure would understand the many variations, modifications, and alternative examples thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An example of the devices, systems, and methods may include any one or more, and any combination of, the examples described below.

Example 1 includes one or more examples, and includes an apparatus comprising: a switch comprising: circuitry, when operational, to: receive a packet comprising a header and a payload and in conjunction with performance of computation on the packet payload, forward the packet header, but not the payload, to a destination endpoint.

Example 2 includes one or more examples, wherein the destination endpoint of the packet is to perform management of reliable transport.

Example 3 includes one or more examples, wherein the circuitry comprises: programmable data plane circuitry comprising ingress pipeline or egress pipeline and one or more match action units (MAUs) to perform processing of the payload, wherein the programmable data plane circuitry is to perform computation on the packet payload.

Example 4 includes one or more examples, wherein the computation on the packet payload comprises one or more of: aggregation phase of a reduce-scatter process and/or write and/or read operations of an Allgather phase of a multicast operation and wherein the aggregation phase comprises one or more of summation or min-max.

Example 5 includes one or more examples, wherein the packet is to identify a total number of workers in a work group in the header and the switch is to provide processed data to the destination endpoint after the total number of workers have sent data to the switch.

Example 6 includes one or more examples, wherein the switch comprises circuitry to store a computed result data from the performance of computation on the packet payload and circuitry to forward at least one packet with the computed result data to a compute node that executes a worker.

Example 7 includes one or more examples, wherein the circuitry to store a computed result data from the performance of computation on the packet payload and circuitry to forward at least one packet with the computed result data to a compute node that executes a worker is to insert the computed result data in at least one packet received from a server and forward the at least one packet received from the server with the inserted computed result data.

Example 8 includes one or more examples, wherein the switch comprises one or more of: network interface controller (NIC), SmartNIC, router, forwarding element, infrastructure processing unit (IPU), or data processing unit (DPU).

Example 9 includes one or more examples, comprising a server to execute a parameter server that is to receive computed result data from the performance of computation on the packet payload and perform connection maintenance and management with at least one compute node that executes a worker.

Example 10 includes one or more examples, comprising a data center that includes the at least one compute node that executes a worker and the server, wherein the at least one compute node is to send data to the server via the switch for neural network training and/or inference operations.

Example 11 includes one or more examples, and includes a computer-readable medium comprising instructions stored thereon, that if executed by one or more processors, cause: configuration of a network interface device to: based on receipt of a packet from a worker, perform packet payload processing and offload transport header processing and connection maintenance to a server, wherein the packet indicates a worker that contributes data for processing.

Example 12 includes one or more examples, wherein the packet payload processing comprises one or more of: aggregation phase of a reduce-scatter process and/or Allgather phase of a multicast operation.

Example 13 includes one or more examples, wherein the packet identifies a total number of workers in a work group in a header and the instructions cause the network interface device to be configured to provide processed data to the server after the total number of workers have sent data to the network interface device.

Example 14 includes one or more examples, wherein the network interface device comprises circuitry to store computed result data and to forward at least one packet to a compute node that executes a worker with the computed result data.

Example 15 includes one or more examples, comprising instructions stored thereon, that if executed by one or more processors, cause: configuration of the network interface device to store computed result data and to forward at least one packet to a compute node that executes a worker with the computed result data by insertion of the computed result data in a packet with no payload.

Example 16 includes one or more examples, and includes a method comprising: performing packet payload processing at a network interface device while offloading network connection maintenance to a server and forwarding packets related to network connection maintenance from the server to one or more compute nodes that execute workers.

Example 17 includes one or more examples, wherein the packet payload processing comprises one or more of: aggregation phase of a reduce-scatter process and/or Allgather phase of a multicast operation.

Example 18 includes one or more examples, wherein the packet identifies a total number of workers in a work group in a header and comprising: the network interface device providing processed data to the server after the total number of workers have sent data to the network interface device.

Example 19 includes one or more examples, and includes at the network interface device, storing computed result data and forward at least one packet to a compute node that executes a worker with the computed result data.

Example 20 includes one or more examples, wherein the network interface device comprises one or more of: network interface controller (NIC), SmartNIC, router, switch, forwarding element, infrastructure processing unit (IPU), or data processing unit (DPU).

What is claimed is:

1. An apparatus comprising:
    a switch comprising:
        circuitry, when operational, to:
        receive a packet comprising a header and a payload and in conjunction with performance of computation on the packet payload, forward the packet header, but not the payload, to a destination endpoint;
    wherein:
        the circuitry comprises one or more match action units (MAUs) to perform one or more actions based upon match table data and the packet header;
        the one or more actions comprise (1) the performance of the computation on the packet payload, and (2) insertion of computed results data, based upon the performance of the computation on the packet payload, in packet data to be sent to at least one worker;
        the switch comprises circuitry to store a computed result data from the performance of computation on the packet payload and circuitry to forward at least one packet with the computed result data to a compute node that executes a worker; and
        the circuitry to store a computed result data from the performance of computation on the packet payload and the circuitry to forward at least one packet with the computed result data to a compute node that executes a worker are to insert the computed result data in at least one packet received from a server and forward the at least one packet received from the server with the inserted computed result data.

2. The apparatus of claim 1, wherein the destination endpoint of the packet is to perform management of reliable transport.

3. The apparatus of claim 1, further comprising:
    programmable data plane circuitry comprising ingress pipeline or egress pipeline and the one or more match action units (MAUs) to perform processing of the payload, wherein the programmable data plane circuitry is to perform computation on the packet payload.

4. The apparatus of claim 1, wherein the computation on the packet payload comprises one or more of: aggregation operation in a reduce-scatter phase, write operation in an Allgather phase, or read operation in an Allgather phase and wherein the aggregation operation comprises one or more of summation or min-max.

5. The apparatus of claim 1, wherein the packet is to identify a total number of workers in a work group in the header and the switch is to provide processed data to the destination endpoint after the total number of workers have sent data to the switch.

6. The apparatus of claim 1, wherein the switch comprises:
    circuitry to
        receive a packet comprising a computed result data and to store the computed result data,
        form a second packet based on the stored computed result data and at least one received header, and
        cause transmission of the second packet.

7. The apparatus of claim 1, wherein the switch comprises one or more of: network interface controller (NIC), SmartNIC, router, forwarding element, infrastructure processing unit (IPU), or data processing unit (DPU).

8. The apparatus of claim 1, comprising a server to execute a parameter server that is to receive computed result data from the performance of computation on the packet payload and perform connection maintenance and management with at least one compute node that executes a worker.

9. The apparatus of claim 8, comprising a data center that includes the at least one compute node that executes a worker and the parameter server, wherein the at least one compute node is to send data to the parameter server via the switch for neural network training and/or inference operations.

10. A non-transitory computer-readable medium comprising instructions stored thereon, that if executed by one or more processors, cause:
    configuration of a network interface device to:
        based on receipt of a packet from a worker, perform packet payload processing and offload transport header processing and connection maintenance to a server, wherein the packet indicates a worker that contributes data for processing;
    wherein:
        the network interface device comprises one or more match action units (MAUs) to perform one or more actions based upon match table data and packet header data;
        the one or more actions comprise (1) performing, at least in part, the packet payload processing, and (2) insertion of computed results data, based upon the packet payload processing, in packet data to be sent to at least one worker; and
        the packet identifies a total number of workers in a work group in a header and the instructions cause the network interface device to be configured to provide processed data to the server after the total number of workers have sent data to the network interface device.

11. The non-transitory computer-readable medium of claim 10, wherein the packet payload processing comprises one or more of: aggregation operation in a reduce-scatter phase, write operation in an Allgather phase, or read operation in an Allgather phase.

12. The non-transitory computer-readable medium of claim 10, wherein the network interface device comprises circuitry to store the computed results data and to forward at least one packet to a compute node that executes a worker with the computed results data.

13. The non-transitory computer-readable medium of claim 10, comprising instructions stored thereon, that if executed by one or more processors, cause:
configuration of the network interface device to store the computed results data and to forward at least one packet to a compute node that executes a worker with the computed results data by insertion of the computed results data in a packet with no payload.

14. A method comprising:
performing packet payload processing at a network interface device while offloading network connection maintenance to a server and
forwarding packets related to network connection maintenance from the server to one or more compute nodes that execute workers;
wherein:
the network interface device comprises one or more match action units (MAUs) to perform one or more actions based upon match table data and packet header data;
the one or more actions comprise (1) performing, at least in part, the packet payload processing, and (2) insertion of computed results data, based upon the packet payload processing, in packet data to be sent to at least one worker; and
the packet identifies a total number of workers in a work group in a header and the method further comprises:
the network interface device providing processed data to the server after the total number of workers have sent data to the network interface device.

15. The method of claim 14, wherein the packet payload processing comprises one or more of: aggregation operation in a reduce-scatter phase, write operation in an Allgather phase, or read operation in an Allgather phase and wherein the aggregation operation comprises one or more of summation or min-max.

16. The method of claim 14, comprising:
at the network interface device, storing the computed results data and
forward at least one packet to a compute node that executes a worker with the computed results data.

17. The method of claim 14, wherein the network interface device comprises one or more of: network interface controller (NIC), SmartNIC, router, switch, forwarding element, infrastructure processing unit (IPU), or data processing unit (DPU).

\* \* \* \* \*